United States Patent [19]
Hoagland et al.

[11] Patent Number: 5,455,103
[45] Date of Patent: Oct. 3, 1995

[54] ROUGH-SURFACED INTERLAYER

[75] Inventors: John C. Hoagland; Harold H. Hopfe, both of Longmeadow, Mass.

[73] Assignee: Monsanto Company, St. Louis, Mo.

[21] Appl. No.: 185,348

[22] Filed: Jan. 24, 1994

[51] Int. Cl.⁶ .............................. B32B 3/28; C03C 27/00
[52] U.S. Cl. ..................... 428/167; 428/212; 156/102; 156/209
[58] Field of Search ................................. 428/156, 167, 428/172, 212, 437, 220, 192, 141, 120, 105; 156/102, 104, 209, 242, 268; 264/167, 177.1

[56] References Cited

U.S. PATENT DOCUMENTS

| | | | |
|---|---|---|---|
| 4,112,166 | 9/1978 | Chyu | 428/141 |
| 4,135,023 | 1/1979 | Lloyd et al. | 428/167 |
| 4,397,246 | 8/1983 | Ishida et al. | 428/167 |
| 4,452,840 | 6/1984 | Sato et al. | 428/156 |
| 4,455,337 | 6/1984 | Lloyd et al. | 428/167 |
| 4,868,940 | 9/1989 | Masadi | 428/167 |
| 4,925,725 | 5/1990 | Endo et al. | 428/156 |

*Primary Examiner*—Donald J. Loney
*Attorney, Agent, or Firm*—Michael J. Murphy; Mark F. Wachter

[57] ABSTRACT

A thermoplastic interlayer, such as of polyvinyl butyral, has a regular pattern of deairing channels formed in each side which are angularly arranged with respect to each other wherein, to avoid moire, the angle of intersection is at least 25 degrees, preferably 90 degrees.

17 Claims, 3 Drawing Sheets

ROUGH-SURFACED INTERLAYER

BACKGROUND OF THE INVENTION

This invention relates to thermoplastic interlayer having rough surfaces and more particularly to a particular form of rough surface for optimum deairing in a prelaminate with glass.

Thermoplastic interlayer (sometimes called "sheet" herein), typically of polyvinyl butyral (PVB), is known for use with optically transparent glass in laminated safety glass assemblies used, for example, in vehicle windshields, building windows and the like.

It is further known, (see, for example, U.S. Pat. No. 4,035,549, to Kennar) to roughen the major surfaces of the sheet to facilitate deairing, i.e. evacuating air from an interface between the sheet and a glass layer during preparation of a prelaminate of the sheet with glass. More specifically, minute channels between the smooth surface of the glass and the rough surface of the opposing contiguous sheet form routes for air to escape from between the two members when pressure or vacuum is applied with heat during preparation of the prelaminate. The deaired prelaminate is then subjected to elevated temperature and pressure bonding conditions, usually in a downstream autoclave, to form the finished safety glass assembly.

Inadequate deairing results in visual defects in the finished safety glass assembly in the form of undesirable bubbles or local unlaminated regions. Deair completeness is conveniently measured by light transmission through the prelaminate before final laminating in the autoclave. The greater such transmission, the greater the quality of deairing provided by a particular profile of rough surface.

Optimum deairing continues as a need in the laminated safety glass art.

A surface profile to optimize deairing is disclosed in commonly assigned, copending U.S. application Ser. No. 08/106,742, filed Aug. 16, 1993, titled Rough-Surfaced Interlayer. However, as therein noted in Example C1, to avoid the presence in the interlayer of an undesirable moire appearance, the roughness surface profile is different on each side of the sheet. Moire patterns typically visually resemble a kind of plaid or wood grain appearance usually as a result of superimposed regular patterns on each side of the interlayer. It would be desirable to avoid moire without the complexity of developing radically different surfaces on each side of the interlayer.

SUMMARY OF THE INVENTION

Now, improvements have been made in interlayer surface roughness patterns which avoid the moire problem.

Accordingly, a principal object of this invention is to provide rough-surfaced interlayer with a regular roughness surface pattern on each side to optimize deairing while avoiding moire effects.

Another object is to provide a prelaminate of high quality as determined by a remarkably high degree of light transmission there through.

A specific object is to provide a method of avoiding moire in a rough-surfaced interlayer having the same pattern on each side.

A further object is to provide an interlayer surface pattern which survives shaping of the interlayer without significantly adversely affecting deair performance.

Other objects will in part be obvious and will in part appear from the following detailed description and claims.

These and other objects are accomplished by a thermoplastic interlayer, preferably of PVB, having a regular pattern of channels formed in each side which are angularly arranged with respect to each other wherein the angle of intersection is at least 25 degrees.

Also provided is a method of avoiding moire in a rough-surfaced thermoplastic interlayer which comprises providing regular linear patterns on each side of the interlayer which intersect each other at an angle of at least 25 degrees.

BRIEF DESCRIPTION OF THE DRAWINGS

In describing the overall invention, reference will be made to the accompanying drawings wherein.

DETAILED DESCRIPTION OF THE INVENTION

Figure 1:
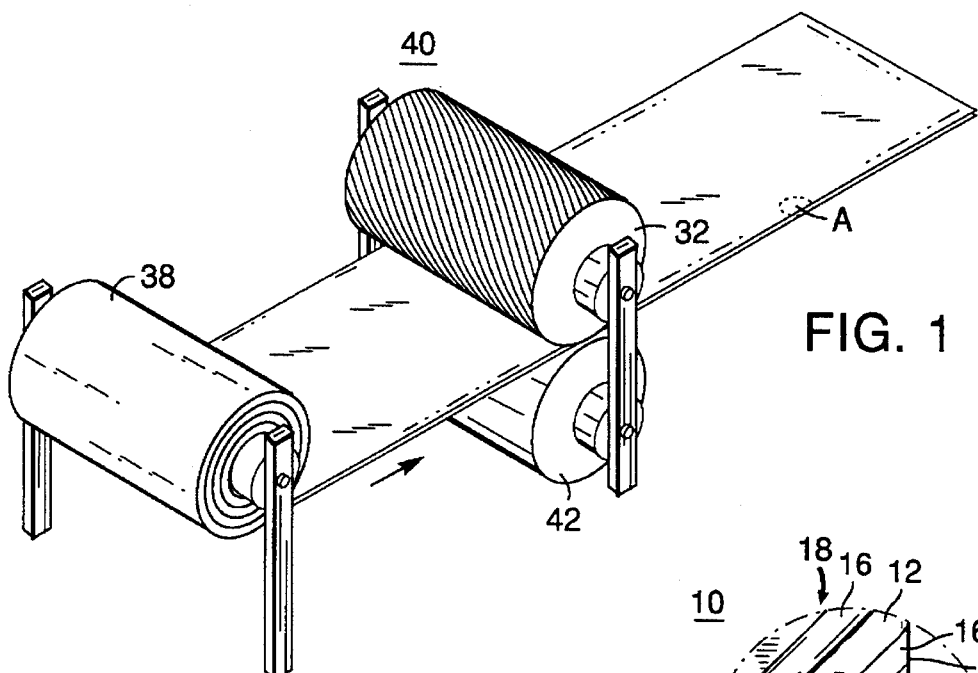
FIG. 1 is a schematic view of an embossing system for developing surface roughness in an interlayer according to the invention.

Thermoplastic interlayer according to the invention must be capable of strongly bonding to a rigid panel such as glass to form an impact-dissipating layer in a laminated safety glass assembly. Exemplary thermoplastics include poly(ethylene-vinyl acetate), poly(ethylene-vinyl acetate-vinyl alcohol), poly(ethylene-methyl methacrylate-acrylic acid), polyurethane, plasticized polyvinyl chloride, polycarbonate, etc. Polyvinyl butyral (PVB) and more particularly partial PVB containing about 10 to 30 weight % hydroxyl groups expressed as polyvinyl alcohol is preferred. Such partial PVB further comprises about 0 to 2.5 weight % acetate expressed as polyvinyl acetate with the balance being butyral expressed as polyvinyl butyral. The non-critical thickness of the thermoplastic sheet can vary and is typically about 0.25 to 1.5 mm, preferably 0.35 to 0.75 mm. PVB sheet is commercially available from Monsanto Company as Saflex® sheet and E.I. dupont de Nemours and Co. as Butacite® polyvinyl butyral resin sheeting.

PVB sheet is plasticized with about 20 to 80, preferably 25 to 45 parts of plasticizer per 100 parts of PVB resin. Such plasticizers are known to those skilled in the art and are typically disclosed in U.S. Pat. No. 4,654,179, col. 5, lines 56–65, the content of which is incorporated herein by reference. Dihexyl adipate is preferred.

In addition to plasticizer(s), sheet of the invention may optionally contain additives to improve performance such as dyes, pigment colorants, light stabilizers, antioxidants, glass adhesion control agents and the like. The sheet may be provided with a colored anti-glare gradient band extending along one side adjacent its edge which may be incorporated into the sheet according to the method and system disclosed in U.S. Pat. No. 4,316,868, the content of which is incorporated herein by reference.

Referring to the drawings, thermoplastic interlayer 10 in FIGS. 2, 3, 8 and 9 comprises a multitude of parallel, narrow, open top, flat bottom, linear deairing channels 12 which are substantially unobstructed in the direction of arrow 14 along their length. The sides of channels 12 are delimited by continuous, uninterrupted, regularly spaced ridges 16 arranged in a diagonal pattern and integrally formed in the surface of one side 18 (FIGS. 2 and 8) of interlayer 10. Immediately adjacent, neighboring ridges 16 are spaced (20 in FIG. 2) about 100 to 350 microns from each other and are about 30 to 70 microns in height (22 in FIG. 8) above the base of a channel 12. These dimensional relationships may vary from the preferred ranges just defined without departing from the anti-moire aspect of the invention. In the illustrated embodiment, channels 12 and ridges 16 in side 18 of interlayer 10 are diagonally arranged at 45 degrees (FIG. 2) to straight edge 17 of interlayer 10.

Figure 3:
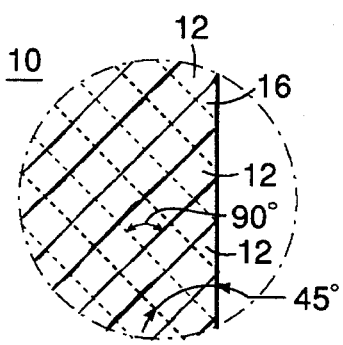
Figure 7:
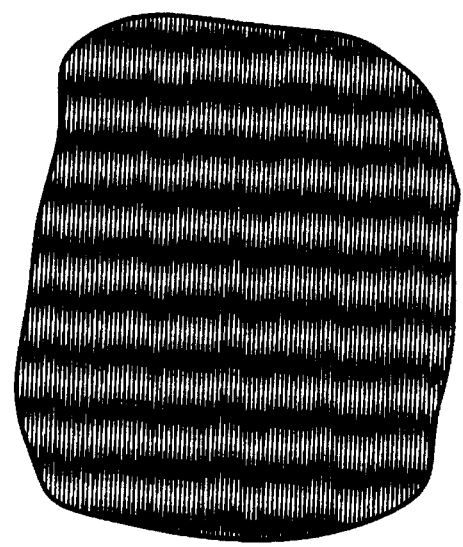
FIGS. 7 and 9 are plan views of interlayer surfaces schematically illustrating the presence (FIG. 7) and absence (FIG. 9) of moire patterns.
Figure 8:
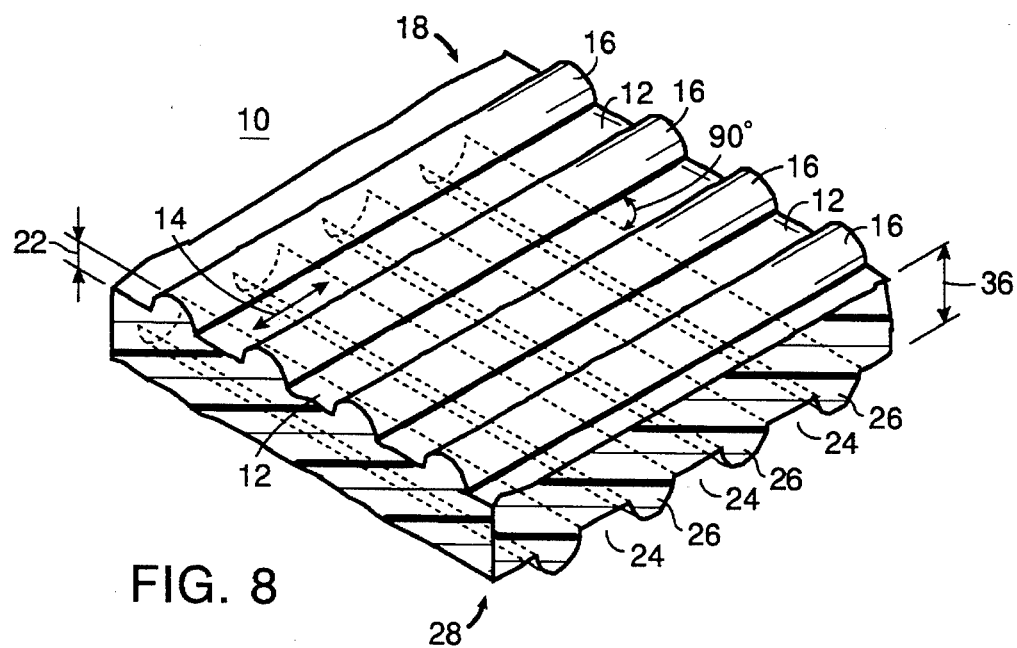
FIG. 8 is a partial, isometric view on an enlarged scale of the sheet of FIG. 3.
Figure 9:
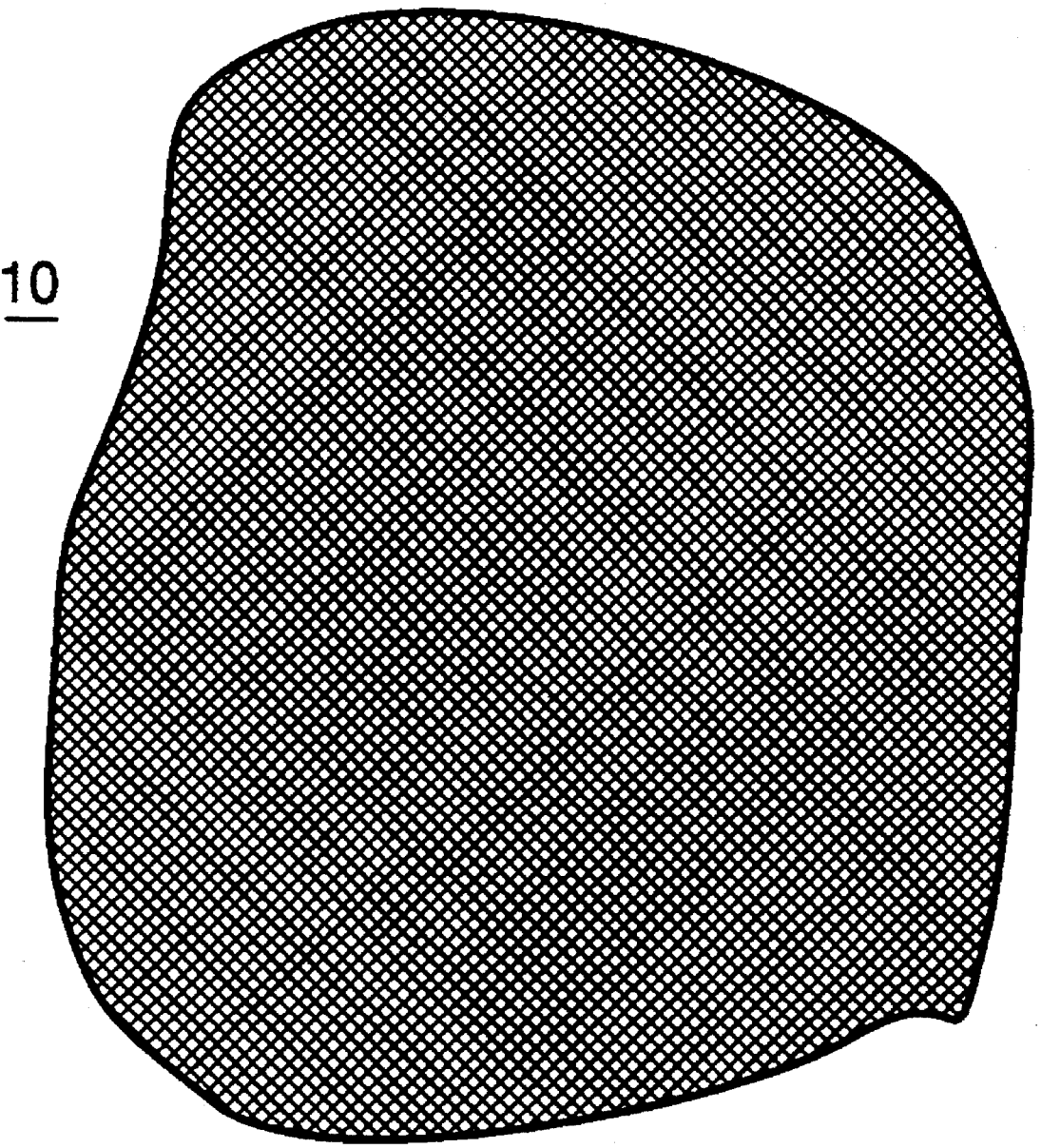

Channels 24 delimited by ridges 26 (FIG. 8) integrally formed in the surface of the other side 28 of interlayer 10 are identical to those in side 18 and likewise are at 45 degrees (FIG. 3) to edge 17. Importantly, however, to avoid moire the regular linear patterns of rows and ridges on each side of interlayer 10 are arranged with respect to each other so as to intersect each other at an angle of at least, and preferably greater than 25 degrees, most preferably greater than 30 degrees. In the illustrated embodiment, the regular pattern of rows of identical channels and ridges on each side intersect each other at an acute angle of about 90 degrees (FIGS. 3 and 8). As illustrated in FIG. 7, when the linear pattern of channels and ridges on one side intersect those on the other side at an angle less than 25 degrees, and specifically at 5 degrees for the FIG. 7 pattern, undesirable moire is present in the form of the depicted plaid or wood grain appearance.

Figure 6:
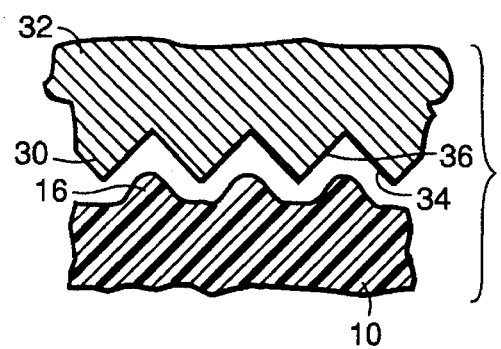
FIG. 6 is a partial, sectional view on an enlarged scale of a portion of the system of FIG. 1.

The shape in cross section of ridges 16, 26 (as well as that of channels 12, 24 formed thereby) is arbitrary and may differ from the rounded configuration shown. For example, depending on forming conditions they may more faithfully duplicate a triangular formation as defined by sawteeth 30 (FIG. 6) helically formed in the cylindrical face of embossing roll 32 (FIG. 1). In the FIG. 6 embodiment, sides 34, 36 of immediately adjacent V-shaped sawteeth 30 are of equal length and sharply intersect at 90 degrees, although, for ease of fabrication, a slight radius may be present where such surfaces intersect as well as at the apex of a sawtooth 30. Alternative cross sectional configurations in the embossing roll surface to define ridges forming the channels in the interlayer surfaces include, rectangular, square, parabolic, semi-circular, trapezoidal, sinusoidal and the like, including combinations of the foregoing.

Different linear or substantially linear regular patterns may be used from those of the illustrated embodiment to provide substantially open paths for air discharge during prelaminate preparation. Such patterns are preferably substantially identical on each side but, if desired, may be different but regular on each side. With each such pattern set, however, the angle of intersection of the pattern on one side with respect to that on the other side should not be less than 25 degrees to avoid the moire effect. Regular patterns are distinguished from random patterns where, with the latter, projections and depressions forming the rough sheet surface are irregularly arranged in a disordered pattern.

Interlayer thickness 36 (FIG. 8) between the surface patterns on each side avoids impressing one pattern on the other and preserves the open substantially uninterrupted channels extending to the edges of the interlayer to provide relatively rapid and complete deairing. More particularly, when sawteeth 30 in the embossing roll surface form channels 24 on side 28 of interlayer 10 after first forming channels 12 in surface 18 in a prior pass, the latter channels 12 are not disturbed by the action of the teeth on side 28 since thickness 36 inward of channels 12 on side 18 serves as a protective layer to avoid disrupting the pattern on first side 18. The thickness of such protective layer is typically about 70 to 80% of the total thickness of the interlayer.

Techniques and systems for characterizing roughness and, more particularly, for measuring the height or amplitude of the ridges and the distance between neighboring ridges are known to those skilled in the art and are typically disclosed in: U.S.Pat. No. 2,904,844, col, 3, lines 15–18; U.S. Pat. No. 3,591,406, col. 3, lines 49–53; U.S. Pat. No. 4,035,549, col. 2, lines 5–28; U.S. Pat No. 4,925,725, col. 2, line 40 to col. 3, line 47; U.S. Pat. No. 5,091,258, col. 7, lines 34–53. Variability associated with irregular random patterns of the type disclosed in these references may not apply to the regular patterns of this invention. The disclosed systems for physically measuring roughness dimensions are nevertheless still usable.

The system used herein to characterize roughness is a model S8P Perthometer from Mahr Corporation, Cincinnati, Ohio which uses a tracing stylus to measure actual roughness. In this regard, as used herein, $R_z$ (in microns, µ) is defined according to DIN 4768 (May, 1990) and is the average height of the ridges within a reference length $1_e$ which can be set as desired and is 2.5 mm in the Examples following. $S_m$ (µ) within a reference length $1_m$ (12.5 mm herein) is defined as the average distance between ridges and is characterized according to DIN 4762.

Prelaminate light transmission is measured with a photometer from Tokyo Denshoku Co., or equivalent. A light transmission measurement is relative to a clear laminate obtained after autoclave bonding which is taken to be 100%.

Conventional embossing techniques are used to produce the regular patterns on the surfaces of interlayer 10. More particularly, with respect to the illustrated embodiment, the rolling shaping engagement of sawteeth in the periphery of the embossing roll compressively displace local regions of the surface of the thermoplastic interlayer to form the described deairing channels between linear ridge formations. These shaping systems are situated downstream of a sheet-shaping die and typically involve passage of the interlayer through a nip between two rotating rolls, i.e. an embossing roll having a pattern in its surface which is a complementarily-shaped negative of the pattern formed in the interlayer and a cooperating backup roll. FIG. 1 at 40 shows a usable representative embossing system.

The invention is further described in the following examples which are for illustration only and not to limit or restrict the invention.

EXAMPLE C1

This is not according to the invention.

Thirty mils (0.76 mm) thick Saflex® interlayer sheet containing about 32 parts plasticizer per 100 parts PVB resin is obtained from Monsanto Company. The sheet has a rough surface on each side characterized by values for $R_z$ (amplitude of the peaks) of 30 to 55 microns and $S_m$ (frequency or space between peaks) of 450 to 600 microns. The roughness pattern is random in that the peaks and valleys vary in height. This pattern is generated by melt fracture, typically during passage of the thermoplastic of the sheet through a rectangular sheeting die opening in an extrusion head wherein the opening is delimited by land surfaces purposely regulated at a temperature below that of the extruding melt. Such temperature is achieved by flowing an appropriate temperature-conditioning fluid through channels just below the land surfaces.

Rolled sheet (38 in FIG. 1) 40 inches (102 cm) wide as just described at 55° F. (13° C.) is continuously unwound at 10 to 30 fpm (3 to 9 meters per min) and fed to embossing station 40 in FIG. 1 comprising a 6.5 inch (16.5 cm) diameter embossing roll pressing against a 6.5 inch (16.5 cm) diameter rubber-faced backup roll 42 at a contact pressure of 30 to 62 pounds per sq. inch (207 to 427 kPa). The entire metal surface of the embossing roll is engraved with a multitude of sharply profiled identical, individual microscopic embossments (not shown) which are V-shaped in vertical cross section. The embossments are arranged in a regular pattern at a frequency of 88 per inch (224 per cm.) in the form of linear rows extending in mutually perpendicular directions. The embossments and pattern are more completely described on page 6, lines 3–24 of commonly owned copending U.S. application Ser. No. 08/106,742, filed Aug. 16, 1993. The face of the cooperating backup roll is covered with a high extensibility, temperature-resistant rubber capable of stretching without fracturing. An anti-stick release coating is on the surface of the embossing roll which is regulated at 163° C. by the conventional presence of an appropriate heating medium beneath the embossing surface. A conventional vacuum roll (not shown) downstream of the nip formed by the embossing and backup rolls pulls the embossed sheet from the embossing roll surface. The unembossed sheet passes through the nip, is removed by the vacuum roll beyond the nip, passes (270 degree wrap) over a chilled (minus 7° C.) cooling roll and is rewound. The wound sheet with one side embossed is then unwound again and the foregoing process repeated to emboss the other side.

Sheet sections embossed on each side with a regular pattern in the manner just described are observed to be visually displeasing to the eye and considered commercially unacceptable. This appearance is illustrated in FIG. 7 and described as a moire pattern thought to be caused by the embossments being out of exact register on each side of the sheet—i.e. the slightly different frequency on each side results in interference patterns out of phase with each other. As apparent in FIG. 7, interlayer sheet with such a moire effect presents an undulating pattern similar to a wood grain appearance.

EXAMPLE 1

This is according to the invention.

Figure 4:
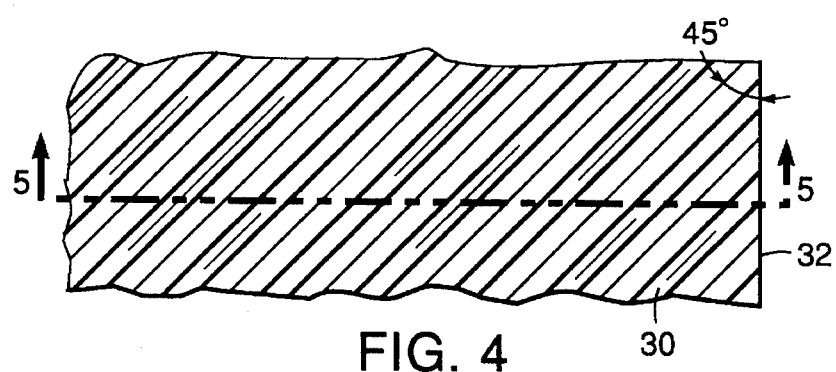
FIG. 4 is a partial, plan view of the embossing roll of FIG. 1.
Figure 5:
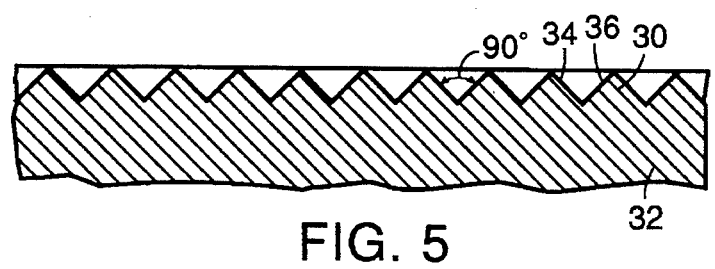
FIG. 5 is a sectional view along 5—5 of FIG. 4.

The embossing roll of Example C1 is replaced with one (32 in FIG. 1) having a shaping surface engraved with the sawtooth configuration of FIG. 5 wherein the sides of immediately adjacent sawteeth are at ninety degrees to each other. As shown in FIGS. 1 and 4, the sawteeth form continuous helical ridges on the roll surface oriented at 45 degrees with respect to the longitudinal roll axis. The frequency of the ridges is 80 per inch (203 per cm) measured normal to the helical direction.

Figure 2:
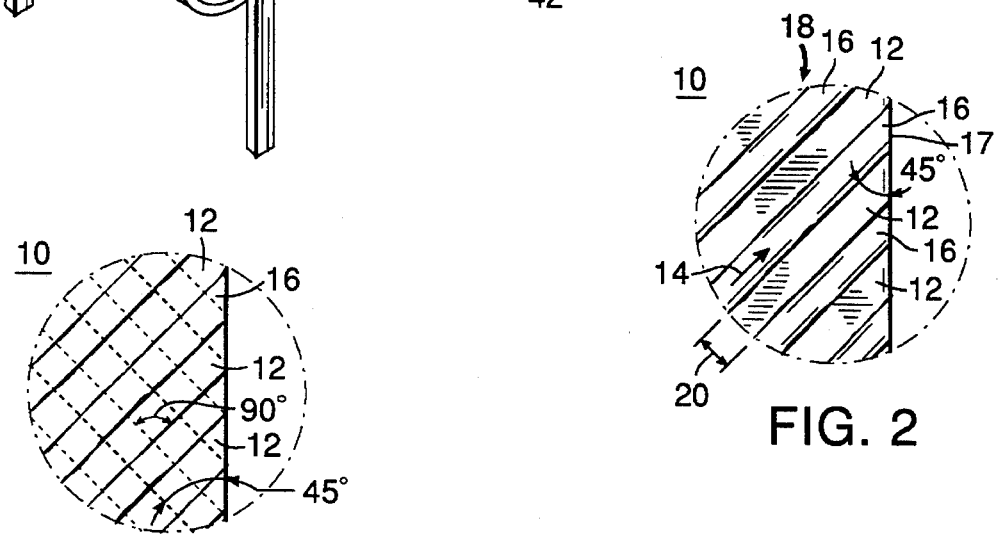
FIGS. 2 and 3 are partial, schematic, plan views on an enlarged scale of interlayer sections of the invention wherein the area of enlargement is identified as A in FIG. 1.

Using sheet as described in Example C1, the procedure of Example C1 is repeated to provide the diagonal row pattern of FIG. 2 on one side and that of FIG. 3 after embossing the other side. As illustrated in FIG. 3, the intersecting angle of the superimposed channels in the sheet surfaces is 90 degrees. The amplitude (height) of the ridges in the sheet (or depth of the channels between ridges) ($R_z$) is about 60 microns. When the interlayer before embossing has an initial rough surface as in the present Example, the embossing depth (22 in FIG. 8) should be at least as deep as the height ($R_z$) of the peaks in the initial rough surface. The distance between adjacent ridges (or width of a channel between ridges) is 312 microns thereby providing the multitude of long, uninterrupted narrow channels running across each side of the sheet which are open at their ends at the edges of the interlayer to the surroundings to optimize deairing in forming the prelaminate. Visual study and photographs of the embossed sheet shows no moire effect whatsoever. The rough surfaces cause the embossed sheet to appear opaque, but this roughness is impermanent and eventually collapses under the influence of heat and pressure to form a smooth, optically clear surface when laminated at elevated temperature and pressure in forming the finished safety glass assembly.

Sheet sections at about 15°–18° C. embossed on each side as just described are placed between two layers of similarly dimensioned float glass at about 30° C. to raise the sheet to this temperature. The three layer glass/sheet/glass assembly is placed in a flexible rubber bag connected to a negative pressure source to develop a pressure of ⅓ atmosphere (33.5 kPa) within the bag thereby drawing air from the two interfaces of the sheet with the glass. The three layer assembly is then passed through an oven to raise the temperature of the three layers to about 100° C. and then removed and cooled to room temperature. The percent light transmission of the prelaminate thus formed is measured as 98–100%. This high light transmission is industrially quite acceptable and indicative of the high quality of deairing provided by the surface roughness profile of the invention.

EXAMPLES 2–4 AND C2–C4

This simulates shaping an interlayer having the rough deair surface of the invention on each side. Shaping involves stretching the interlayer usually for the purpose of aligning an initially horizontal gradient color band in the interlayer with the arcuate peripheral contour of the stretched sheet section, such curvature being desired for use of the sheet in a similarly configured contoured vehicle windshield. See, for example, U.S. Pat. No. 5,137,673, issued Aug. 11, 1992 for further disclosure of shaping. Since deairing occurs after shaping it is desirable that the rough surface not substantially collapse during shaping.

12 by 12 in (30.5×30.5 cm) interlayer sections having the surface topography described in Example 1 (30 mm thick) are vertically suspended in a rack and a 2.6 kg steel bar attached at their lower ends. The weighted sections are placed in an oven at 100° C. for 4 min. to vertically elongate the sections 15% and cause the bar to abut a stop in the oven below the elongated sections. This extent of stretch simulates the maximum stretch encountered in a typical full size sheet section intended for use in a contoured vehicle windshield. The stretched sections are removed from the oven and cooled to room temperature. Light transmission results obtained on prelaminates prepared using the procedure described in Example 1 are as follows:

| Example | Unshaped | Shaped |
| --- | --- | --- |
| 2 | 99.4 | 99.2 |
| 3 | 99.6 | 99.2 |
| 4 | 99.9 | 99.3 |

To contrast the above with representative prior art sheet surface topographies, the above procedure is repeated with sheet having a random rough surface of the type described with respect to the initially unembossed sheet in Example 1. Typical roughness values are $R_z$ (height)=44 microns and $S_m$ (frequency)=384 microns. Results obtained are as follows:

| Example | Unshaped | Shaped |
| --- | --- | --- |
| C2 | 87.0 | 80.9 |
| C3 | 91.6 | 87.4 |
| C4 | 92.9 | 84.0 |

The above data (Examples 2, 3, 4) dramatically illustrates that sheet surface patterns according to the invention importantly survive shaping with negligible loss in deairing performance in contrast with the significantly greater loss in deair performance of the prior art random rough surfaces of Examples C2–C4.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

I claim:

1. A thermoplastic interlayer comprising polyvinyl butyral having a regular pattern of channels formed in each side which are angularly arranged with respect to each other wherein the angle of intersection is at least 25 degrees.

2. The interlayer of claim 1 wherein the channels on at least one side are arranged diagonally to an edge of the interlayer.

3. The interlayer of claim 2 wherein the channels on each side are arranged diagonally to an edge of the interlayer.

4. The interlayer of claim 3 wherein the angle of intersection is at least 30 degrees.

5. The interlayer of claim 3 containing an undisturbed substantial portion of its thickness intermediate the channels formed in each side.

6. The interlayer of claim 5 wherein said undisturbed portion is about 70 to 80% of the total thickness of the interlayer.

7. The interlayer of claim 5 wherein the angle of intersection is about 90 degrees.

8. A thermoplastic interlayer comprising polyvinyl butyral which comprises:
   rows of continuous open channels integrally formed in the surface of one side of the interlayer; and
   a similar pattern of continuous, open channels integrally formed in the surface of the other side of the interlayer offset by more than 25 degrees from the channels in the one side.

9. The interlayer of claim 8 wherein the channels are defined by continuous ridges spaced about 100 to 350 microns from each other.

10. The interlayer of claim 9 wherein the amplitude of the ridges is between about 30 to 70 microns.

11. The interlayer of claim 10 wherein the channels are offset by more than 30 degrees.

12. A polyvinyl butyral interlayer comprising:
   a) a multitude of substantially uninterrupted, parallel, narrow linear channels defined by ridges evenly spaced from each other arranged in a diagonal pattern and integrally formed in the surface of one side of the interlayer; and
   b) channels integrally formed in the surface of the other side of the interlayer identical to those in the one side intersecting the channels in the one side at an acute angle greater than 25 degrees.

13. The interlayer of claim 12 wherein immediately adjacent ridges are spaced about 100 to 350 microns from each other.

14. The interlayer of claim 13 wherein the height of the ridges is about 30 to 70 microns.

15. A method of avoiding moire in a rough-surfaced thermoplastic interlayer comprising polyvinyl butyral which is capable of bonding to glass which comprises providing regular linear patterns on each side of the interlayer which intersect each other at an angle of at least 25 degrees.

16. The method of claim 15 wherein the angle of intersection is at least 30 degrees.

17. The method of claim 16 wherein the angle of intersection is 90 degrees.

* * * * *